United States Patent [19]

Hed

[11] Patent Number: 5,246,673
[45] Date of Patent: Sep. 21, 1993

[54] DELTA SINGLET OXYGEN CONTINUOUS REACTOR

[75] Inventor: Aharon Z. Hed, Nashua, N.H.

[73] Assignee: Troy Investments Inc., Nashua, N.H.

[21] Appl. No.: 823,042

[22] Filed: Jan. 15, 1992

Related U.S. Application Data

[60] Continuation of Ser. No. 511,449, Apr. 20, 1990, abandoned, which is a division of Ser. No. 288,403, Dec. 21, 1988, Pat. No. 4,975,265.

[51] Int. Cl.$^5$ .............................................. B01J 10/00
[52] U.S. Cl. ............................... 422/224; 261/78.2; 261/117; 422/234
[58] Field of Search .............. 423/579; 422/111, 120, 422/224, 234, 242; 366/107, 177; 261/78.2, 117

[56] References Cited

U.S. PATENT DOCUMENTS

| | | | |
|---|---|---|---|
| 3,391,908 | 7/1968 | MacDonald | 366/177 |
| 3,607,087 | 9/1971 | Graham | 422/224 |
| 3,626,672 | 12/1971 | Burbidge | 261/117 |
| 3,841,060 | 10/1974 | Hoad | 261/117 |
| 4,310,502 | 1/1982 | Wagner | 423/579 |
| 4,318,895 | 3/1982 | Richardson et al. | 423/579 |
| 4,342,116 | 7/1982 | MacKnight et al. | 423/579 |
| 4,558,451 | 12/1985 | McDermott et al. | 423/579 |
| 4,668,498 | 5/1987 | Davis | 423/579 |
| 4,854,713 | 8/1989 | Soechtig | 422/111 |
| 4,994,242 | 2/1991 | Rae et al. | 422/224 |

Primary Examiner—Peter Kratz
Attorney, Agent, or Firm—Herbert Dubno

[57] ABSTRACT

A reactor capable of continuously producing activated species of oxygen molecules, specifically those known in the prior art as "Delta Singlet Oxygen". Uses of "Delta Singlet Oxygen" include the maintenance of high oxidation potential during the deposition of layers of high temperature superconductors. Such species are particularly effective in obtaining ultra smooth surfaces when used as the etching gas in plasma milling of a diamond-like carbon film. The use of a film of this type has been found to be the ideal insulating barrier for construction of high temperature superconducting Josephson junctions. The reactor uses toroidal pipes to generate mutual impingement between a reaction machine and chlorine gas.

7 Claims, 2 Drawing Sheets

DELTA SINGLET OXYGEN CONTINUOUS REACTOR

CROSS REFERENCE TO RELATED APPLICATIONS

This application is a continuation of Ser. No. 07/511,449 filed Apr. 20, 1990 (now abandoned) as a division of Ser. No. 07/288,403 filed Dec. 21, 1988 (U.S. Pat. No. 4,975,265). That application is related to my then pending applications Ser. No. 07/290,178 filed Dec. 23, 1988 (now U.S. Pat. No. 5,064,809) which was divided (Ser. No. 07/863,390 of Apr. 3, 1992) (U.S. Pat. No. 5,171,732) and which discloses a method of and an apparatus for producing the delta singlet oxygen which is here used to reduce the thickness of the deposited diamond-like carbon layer and also may be used during the deposition of the superconductor layers.

BACKGROUND OF THE INVENTION

For some time, a unique excited state of the oxygen molecule has been known to have a relatively long half life. The excitation energy of this species is approximately 1 electron volt, and the half life about 40 minutes. This species has been used as an energy source for Iodine/Oxygen chemical lasers. This species is known in the prior art as "Delta Singlet Oxygen" (see for instance "Chemically Pumped Iodine Laser", by R. J. Richardson and C. E. Wiswall, Appl. Phys. Lett. 35(2), July 1979).

This species can be used to stabilize oxygen content in certain high temperature oxide ceramic superconducting layers and in accurate "milling" of diamond-like carbon insulating layers by plasma etching in which "Delta Singlet Oxygen" is the reactive gas.

"Delta Singlet Oxygen" is formed in the following reaction:

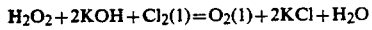

$$H_2O_2 + 2KOH + Cl_2(l) = O_2(l) + 2KCl + H_2O$$

In principle, any other hydroxide of the alkali metals (particularly NaOH, see Richardson et. al.) could be used as well, but at the high concentrations required to obtain an efficient "Delta Singlet Oxygen" production rate, potassium hydroxide had been determined to be most suitable, due to the lower viscosity of the solution and thus the ease of atomization.

In the prior art, the combination of hydrogen peroxide with potassium hydroxide in solution was used as the working medium into which chlorine gas was simply bubbled. "Delta Singlet Oxygen" was collected above this solution. This technique, often termed the "bubbler reactor", has had a number of major shortcomings.

The flow rate of chlorine is strongly limited, since too high a flow rate produces unreacted chlorine that can be deleterious (if not for Iodine/oxygen lasers, certainly for the purpose of depositing and etching superconducting electronic devices). Furthermore, excessive eruption of unreacted chlorine drastically disrupts the surface of the liquid and causes excessive interaction of the solution with the already created "Delta Singlet Oxygen". Obviously, this causes premature deactivation of the "Delta Singlet Oxygen".

In a typical bubbler, "Delta Singlet Oxygen" bubbles created near the interaction zone of the chlorine with the hydroxide and peroxide must travel to the top of the liquid. If the flow rate of the chlorine is very slow, then the bubbles are small and the surface area large. This results in deactivation due to contact with the liquid. If the bubbles are too large, the reaction rate is slow and some free chlorine will reach the surface. Decreasing the column of liquid above the bubbling source is not helpful either, since this action results in a decrease of the reaction path. Drip reaction on wet columns is also part of the prior art, and it's major shortcoming is low yield due to the small available surface area.

I have found a novel approach that can be implemented in a number of ways. The principle of the success of said approach lies in the fact that "Delta Singlet Oxygen" is formed at liquid/gas interfaces, and never travels through the column of liquid which could deactivate the excited state prematurely.

OBJECT OF THE INVENTION

It is an object of the present invention to provide an apparatus for generating Delta Singlet Oxygen.

It is a further object of this invention to provide a system for such generation whereby the concentration of the "Delta Singlet Oxygen" species (regular oxygen with sometimes argon as a carrier) exceeds concentrations achieved in the prior art.

Still another object of the present invention is to present an apparatus capable of generating said "Delta Singlet Oxygen" specifies in an efficient and continuous manner.

A final object is to offer an apparatus capable of generating said "Delta Singlet Oxygen" species which can be effectively used in any external process requiring metastable activated oxygen species for oxidation processes.

SUMMARY OF THE INVENTION

According to the invention in the first design, "Delta Singlet Oxygen" can be produced without a carrier gas, while another embodiment, argon carrier gas is utilized. Both embodiments cause solutions of hydrogen peroxide and potassium hydroxide to impinge as aerosols with gaseous chlorine so as to improve reaction rates and production of "Delta Singlet Oxygen" species. The mechanisms are designed to limit impingement of the freshly produced delta singlet oxygen with the natal solutions and thus avoid deactivation of said species, and to make a pure gas flow of said "Delta Singlet Oxygen" species immediately available for usage thereof.

These reactors are expected to find applications in three distinct areas, namely chemical Iodine/oxygen lasers, superconducting electronic device foundries, and chemical processes involving difficult oxidation processes.

This invention relates to methods of continuously generating "Delta Singlet Oxygen" gaseous species. The instant invention also relates to specially designed apparatus and methods of so generating said "Delta Singlet Oxygen" species which are useful in the preparation and deposition of oxide high temperature superconductors. The invention also relates to methods of generating said "Delta Singlet Oxygen" species at high concentrations so as to make them more amenable to subsequent use in contrast to the prior art.

Methods used for generating activated "Delta Singlet Oxygen" species have included a "bubbler" in which hydrogen peroxide, combined with potassium hydroxide (or often sodium hydroxide) in solution, was used as the working solution. Chlorine gas was bubbled in to form the activated "Delta Singlet Oxygen" species. However, this method has had many shortcomings, not least of which has been the inability to generate the high concentration (more than 50% of total oxygen flow) required for most of the contemplated uses of the "Delta Singlet Oxygen".

I have found certain principles and developed certain apparatus to implement these principles resulting in designs that circumvent this difficulty.

The principle of may invention is to provide for a method of reaction between the fuel (the peroxide/hydroxide solution) and the chlorine gas that avoids excessive contact between the product of reaction (delta singlet oxygen) and the natal solution. When this principle is followed, deactivation of the metastable delta singlet oxygen by transfer of excess energy via multiple nonelastic collisions with the natal solution is avoided. As a result, the active species can decay to its ground state only through the emission of a photon (at about 1.27 microns), a process for which the half life is about 40 minutes.

The improved design of the instant invention involves the formation of two mutually impinging aerosols, (one is the peroxide/hydroxide solution, while the other is the chlorine gas), in such a way as to optimize surface reactions taking place. The process has been designed to be continuous, with only intermittent replacement of the peroxide-hydroxide tank, and only when the reaction product (KCl) reaches too high a level.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
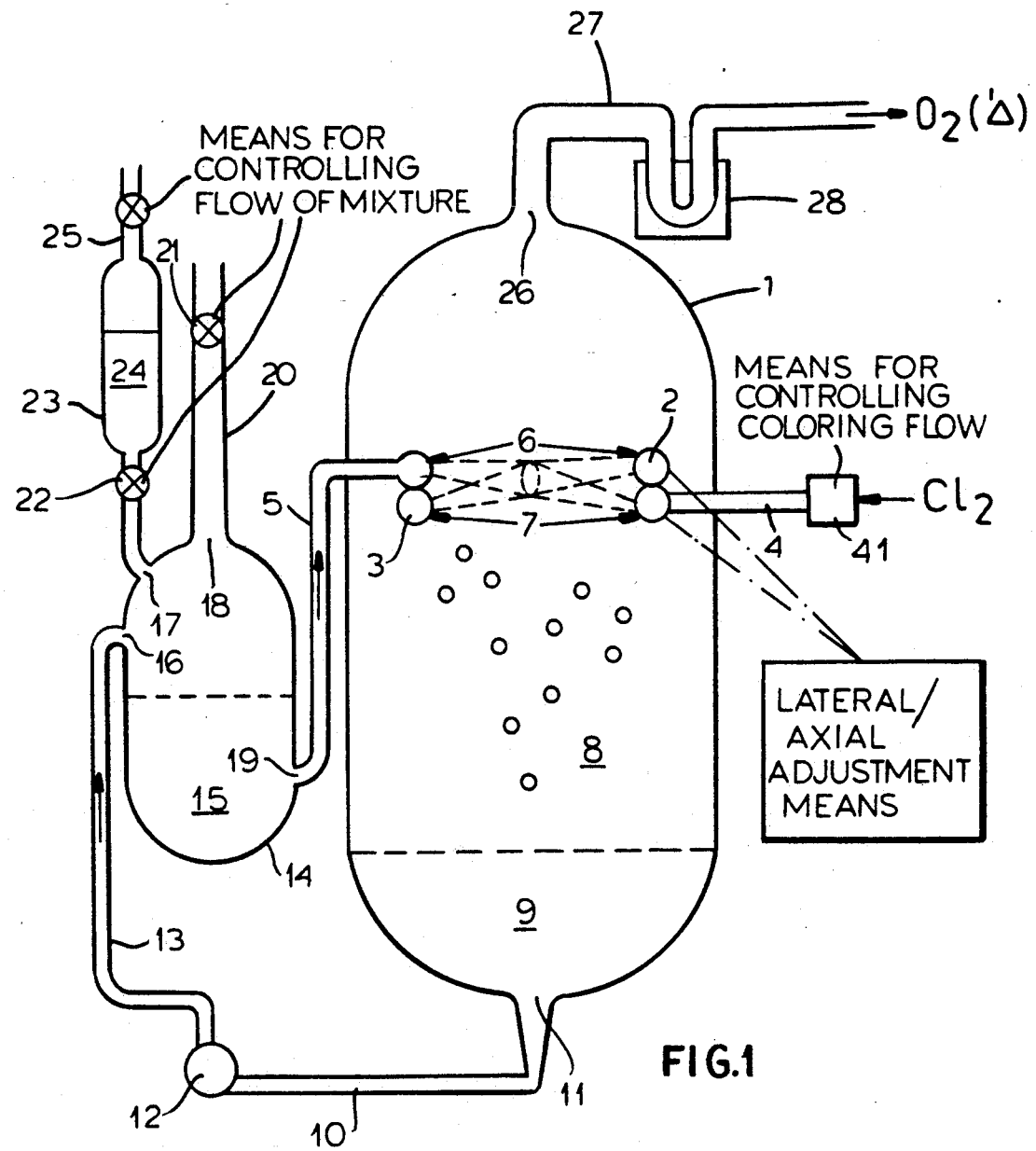
FIG. 1 is a diagrammatic vertical section through an apparatus according to the invention.

The general elements of "Delta Singlet Oxygen" continuous reactor are shown in FIG. 1. In the reaction vessel (1). two hollow toroidal rings (2) and (3) are positioned close together. The lower toroid is supplied with chlorine gas through a feedthrough pipe (4), while the hydroxide/peroxide mixture is fed through a feedthrough pipe (5) to the upper toroid (2). The hydroxide/peroxide toroid (2) has a number of symmetrically positioned nozzles (6) pointing slightly downward on the inner rim of the toroid, while the chlorine toroid has the same number of nozzles (7), positioned each under the midpoint of two hydroxide/peroxide nozzles, and pointing slightly upward. It should be clear to those skilled in the art that the mutual position of the hydroxide/peroxide and chlorine nozzles could be changed, and be aligned with each other. I have determined that the former arrangement works best when nozzle circumferential density is high, while the latter may be preferred when this density is low.

In the operation of the apparatus, the two sprays interact in the center of the two toroids, forming the gaseous "Delta Singlet Oxygen" which escapes upward, while droplets 8 of the hydroxide-peroxide mixture containing KCl in solution are allowed to drop to the bottom of the reactor (9). Since the reaction is always carried out with a specific chlorine deficiency (see below), the solution at the bottom 9 of the reactor will contain large amounts of unreacted hydroxide-peroxide. I have found it best to conduct this solution through a pipe (10) by an opening (11) at the bottom of the reaction vessel, to a recirculating pump (12) and an additional pipe (13) ending back in the "fuel" vessel (14).

At the bottom of the fuel vessel, a sufficient amount of hydroxide-peroxide solution (15) is always maintained. The vessel is equipped with three inlets and an outlet. Inlet (16) allows for entry of the recirculated fuel from the reaction vessel. Inlet (17) allows for intermittent refeed of a hydroxide-peroxide solution to the fuel vessel, so as to compensate for its consumption in the reaction vessel. Inlet (18) allows for pressurization of the fuel vessel with oxygen, while the outlet (19) connects the fuel vessel with the reaction vessel. Alternately, the oxygen conduit (20) can have an optional extension (not shown in the figure) to the bottom of the fuel vessel. A needle valve (21), allows for controlling the oxygen pressure within the fuel vessel and also separates the fuel vessel from the pressurized oxygen source (not shown in the diagram).

A unidirectional variable pressure valve (22) separates the fuel reservoir (23) in which make-up fuel (24) is held from the fuel vessel (14). A pressurized feeding valve (25) allows for intermittent refeed of fuel to the fuel vessel. There are also a number of monitoring devices not shown in the diagram. These include a pH meter in the fuel tank with an associated circuit which will automatically refeed the tank if the fuel pH drops below 9, a manometer controlling the pressure within the vessel, and a variety of temperature and pressure sensing devices assuring the safe operation of the reactor. The valves 21, 22 and 25 constitute a means for controlling flow of the mixture to the respective toroid independently of the means 4' for controlling flow of chlorine to the other toroid.

"Delta Singlet Oxygen" is collected from the reaction vessel (1) through an opening (26) at the top of reactor, leading through a pipe (27) to an optional cold trap (dry ice or liquid nitrogen) (28), in order to remove excessive water vapors from the "Delta Singlet Oxygen" and any potential residual chlorine.

Figure 3:
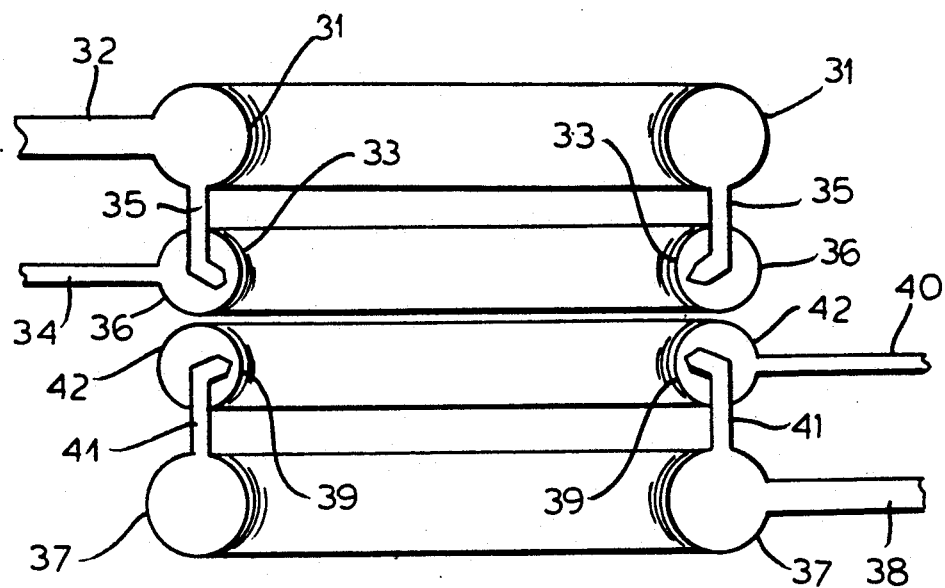
FIG. 3 is an axial section thereof.
Figure 2:
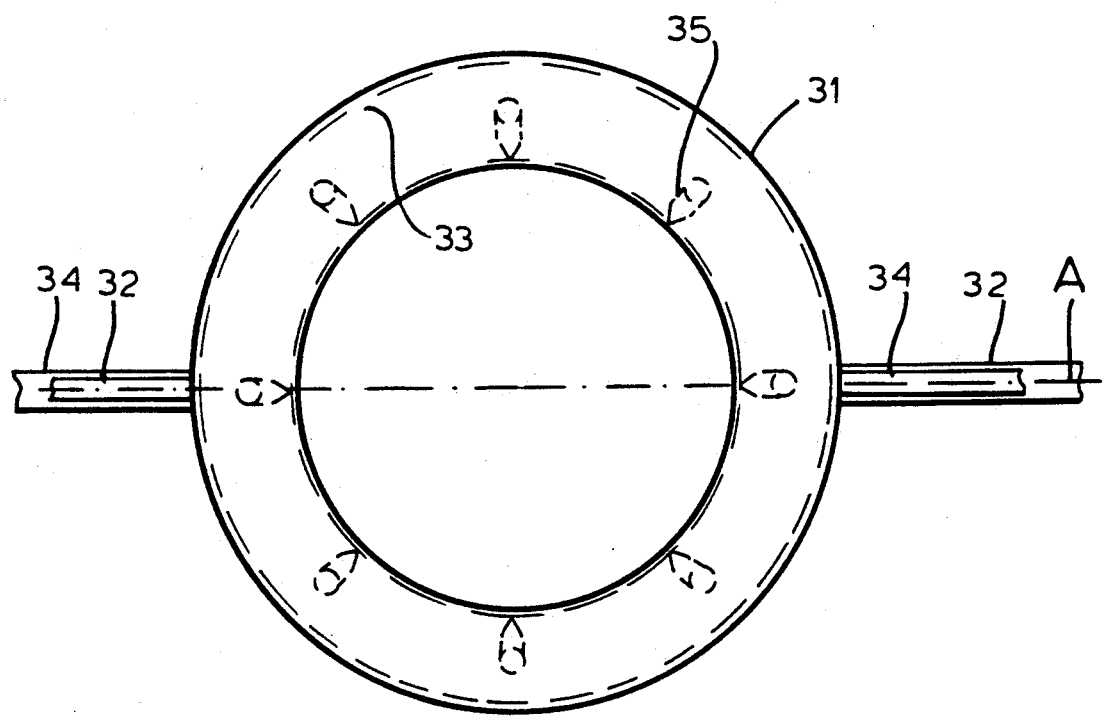
FIG. 2 is a diagrammatic horizontal section through the toroidal assembly.

FIGS. 2 and 3 show a different method for generating "Delta Singlet Oxygen".

There are a total of 4 toroids. The top and bottom toroids, 31 and 37 carry pressurized argon, while toroids 33 and 39 carry the hydroxide-peroxide fuel and chlorine respectively. Toroids 31 and 37 are fed with pressurized argon through appropriate inlets 32 and 38 respectively. It should be obvious to those skilled in the art that the toroids (not only here but also in FIG. 1.) can and should be fed via appropriate manifolds distributed symmetrically around the outer circumference of the appropriate toroids, so as to even the pressure on the respective nozzles in each toroid.

The fuel and chlorine toroids are fed through appropriate piping 34 and 40, respectively. Argon is fed through a multiplicity of inlets, 35 and 41, which are terminated with directional nozzles and positioned symmetrically on the toroids, each within the fuel and chlorine toroid respectively. The nozzles point toward appropriate openings 36 and 42 in the fuel and chlorine toroids respectively. When argon gas is forced through the respective nozzles, it entrains the appropriate species and forms a spray of extremely small droplets from the fuel. I have determined that this imparts kinetic energy to the chlorine, thus allowing the chlorine gas injected to better penetrate into the fuel droplets. This results in a more efficient "Delta Singlet Oxygen" producing reaction. The average radius of the fuel particles decreases with increasing argon pressure, and the penetration range of the chlorine gas in the droplets increases as well.

I have established that the second system described herein does not require pressurization of the fuel as in the first (argonless) embodiment, thus making it a simpler system to implement. Furthermore, much higher conversion rates are possible due to the argon pressurization. It is well to note that the general structure of the second embodiment described herein is also depicted in FIG. 1, except that the toroids assembly is replaced with that described in FIGS. 2 and 3. Another modification as shown in FIG. 1 is that the fuel vessel is not pressurized and thus does not need to be modified accordingly.

In FIG. 1, the fuel vessel is shown as being positioned with its outlet below the position of the toroids. In practice, the fuel vessel in the argon pressurization embodiment of FIG. 2 must be positioned above the toroid assembly to allow for gravitational flow of the fuel to the toroid assembly (since no external oxygen pressure is applied to the fuel). It is still recommended, however, to keep an oxygen pressure which is at least atmospheric above the fuel, to limit loss of hydroxide.

It will be obvious to people familiar with the art that subtle variations of the proposed system are easily implemented. For instance, instead of using a toroid for the feed of the chlorine, a single nozzle positioned at an appropriate distance under the center of the fuel's toroid, spraying upward a conical spray of chlorine could achieve the same end.

It is often required that "Delta Singlet Oxygen" be carried by another inactive gas, FIG. 2, depicts indeed an embodiment of such a reactor with argon as the carrier gas. One should avoid in general the use of non noble gases as carriers for "Delta Singlet Oxygen", since deactivation through molecular impingement with foreign molecules occur. From the noble gases, we chose argon for its low price and appropriate molecular weight (40) between "Delta Singlet Oxygen" (32) and Chlorine (71), thus forming a natural blanket between chlorine and "Delta Singlet Oxygen" in the reactor.

AS EXAMPLES, I CITE:

1. Operation of the Continuous "Delta Singlet Oxygen" Reactor.

The operation of the reactor is fairly simple. Fuel for the "Delta Singlet Oxygen" reactor is comprised of two solutions which are fed in equal parts simultaneously to the fuel reservoir (23). The solutions are specifically 85 wt. % to 95 wt. % $H_2O_2$, and 20 wt. % to 25 wt. % KOH in water.

To prepare such solutions, one weighs out typically 20 to 25 lbs. of KOH pellets and adds them slowly, with stirring, to 100 lbs. of water (about 12.0 gallons). The peroxide solution is acquired as such. Since the unused fuel is recycled, and thus usually contains some unreacted chlorine, the pH of the solution has a tendency to decline. It is preferable to hold the pH at 10, but a range of 9 to 10.5 can be allowed. This is achieved by refeeding fresh hydroxide to the solution via an appropriate feed controlled by an automated pH meter.

The process is started by establishing an appropriate steady state spray of the hydroxide/peroxide solutions through the set of nozzles (6). This is achieved by adjusting the oxygen pressure on the fuel vessel (14) with the needle valve (21). Oxygen was chosen as a pressurizing gas because it promotes the stability of the hydroxide in the fuel solution. When the fuel tank is not pressurized, then one must maintain a $CO_2$ free atmosphere above the caustic solution to prevent its deterioration with time. Once a steady state spray of the fuel is achieved, chlorine is introduced through the set of nozzles (7). The chlorine flow rate is adjusted to be slightly lower than the expected stoichiometric reaction ought to require. This assures full consumption of all the chlorine, its conversion to KCl, and also enhances purity of the resulting "Delta Singlet Oxygen" as well. To assure such purity, one makes sure that the fuel spray completely blankets out the chlorine spray. The special geometrical arrangement of the two toroids and their nozzles have been designed to assure the desired result. In practice, I have found that I could not prevent minimal amounts of the chlorine to be entrained in the spent fuel without reaction, and thus closed cycle adjustment of the pH was found necessary.

2. The apparatus of FIG. 1 is used except that argon gas is used as the pressurizing gas to atomize and form small droplets of the reactants, thus using toroids as described in FIG. 2. Solutions are made up, as in Example 1, and put into the appropriate holding tanks. The required monitoring systems are set up and the several gas pressures are set for operation of the apparatus. During this operation, "Delta Singlet Oxygen" is created at the interface between the fuel droplets and the chlorine gas. Being lighter than the chlorine, "Delta Singlet Oxygen" rises to the outlet (26). The efficiency of the reaction is a strong function of the fuel droplets size. The smaller the droplets, the higher the surface of the fuel droplets, and hence, the reaction rate. Since "Delta Singlet Oxygen" is allowed to move up without any significant interaction with the liquid phase, the excited state is conserved, thus yielding a high percentage of "Delta Singlet Oxygen" in the outgoing stream (80% "Delta Singlet Oxygen"/02* should be achievable). It is well to note that droplet size is determined by the fuel nozzles aperture and the pressure drop on the nozzles, or the oxygen pressure on the fuel vessel (14).

Since chlorine usage is deliberately kept much lower than that required for stoichiometry, the reaction's waste droplets (8) that accumulate on the bottom of the reaction vessel (9) contain valuable unreacted fuel. For this reason, I have provided the recirculating arrangements shown in the preferred design of this invention.

As the reaction proceeds, KCl is expected to build up in the fuel, and when this reaction product exceeds a critical amount (about once a day if the fuel vessel is large enough), the reactor is deactivated and the waste products removed. In some applications, it is important that the "Delta Singlet Oxygen" stream be relatively free of water vapor (a dew point of about −40 C.). For that purpose, the outgoing "Delta Singlet Oxygen" is passed through a cold trap which freezes out the water vapors that can be entrained from the reaction zone to the "Delta Singlet Oxygen" stream. The use of solid drying agents like drierite or diatomaceous earths is not recommended, since these will tend to deactivate the "Delta Singlet Oxygen's" excited state (diatomaceous earths are particularly deleterious).

It is understood that the above described embodiments of the invention are illustrative only and modifications and alterations thereof may occur to those skilled in the art. Accordingly, it is desired that this invention not be limited to the embodiments disclosed herein but is to be limited only as defined by the appended claims.

I claim:

1. An apparatus for the continuous production of delta singlet oxygen, comprising:
   a reactor;
   a source of chlorine gas;
   means for continuously feeding a mixture of hydrogen peroxide and an alkali-metal hydroxide to said reactor;
   chlorine gas feed means connected to said source for feeding chlorine gas to said reactor;
   means in said reactor for forming an aerosol from said mixture and for directing said aerosol and chlorine gas into mutually impinging relationship in a reaction zone to react said mixture with said chlorine gas and produce said delta singlet oxygen, said means in said reactor for forming an aerosol from said mixture and for directing said aerosol and chlorine gas into mutually impinging relationship in said reaction zone including respective toroidal pipes respectively connected to said means for continuously feeding and to said chlorine gas feed means, said toroidal pipes having respective arrays of nozzles training respective jets of said mixture and said chlorine gas directly against one another; and
   means for recovering said delta singlet oxygen in a delta singlet oxygen stream from said reaction zone of said reactor.

2. The apparatus defined in claim 1 wherein the means for recovering said delta singlet oxygen from said reaction zone of said reactor includes means at a top of said reactor for discharging said delta singlet oxygen, said reactor having a bottom provided with means for discharging residual portions of said mixture.

3. The apparatus defined in claim 2, further comprising means for recirculating said residual portions of said mixture to a vessel receiving said mixture and feeding said mixture to said means for continuously feeding.

4. The apparatus defined in claim 1, wherein said means for continuously feeding comprises a vessel receiving said mixture and feeding said mixture to said reactor, and means for pressurizing said vessel with oxygen gas.

5. The apparatus defined in claim 1 wherein said toroidal pipe for supplying said chlorine gas is located below the toroidal pipe feeding said mixture and has upwardly directed nozzles, said toroidal pipe feeding said mixture having downwardly directed nozzles.

6. The apparatus defined in claim 1, further comprising means connected to said reactor for collecting residual water vapor and chlorine from the said delta singlet oxygen stream.

7. The apparatus defined in claim 6 wherein said means connected to said reactor for collecting residual water vapor and chlorine therefrom includes a vapor condensation trap.

* * * * *